United States Patent [19]
Ichinose

[11] Patent Number: 5,983,868
[45] Date of Patent: Nov. 16, 1999

[54] FUEL INJECTION CONTROLLER APPARATUS IN STARTING AN INTERNAL COMBUSTION ENGINE

[75] Inventor: Hiroki Ichinose, Fujinomiya, Japan

[73] Assignee: Toyota Jidosha Kabushiki Kaisha, Japan

[21] Appl. No.: 09/079,019

[22] Filed: May 14, 1998

[30] Foreign Application Priority Data

May 16, 1997 [JP] Japan ................................. 9-127527

[51] Int. Cl.⁶ .................................................. F02D 41/06
[52] U.S. Cl. ..................................... 123/491; 123/179.16
[58] Field of Search .............................. 123/491, 179.16, 123/480

[56] References Cited

U.S. PATENT DOCUMENTS

| | | | |
|---|---|---|---|
| 4,562,817 | 1/1986 | Ito | 123/491 |
| 5,390,641 | 2/1995 | Yamada et al. | 123/491 |
| 5,595,161 | 1/1997 | Ott et al. | 123/491 |
| 5,690,075 | 11/1997 | Tanaka et al. | 123/491 |
| 5,870,986 | 2/1999 | Ichinose | 123/491 |

FOREIGN PATENT DOCUMENTS 62-210230  9/1987  Japan .
245018 B2  10/1990  Japan .

*Primary Examiner*—Willis R. Wolfe
*Assistant Examiner*—Hieu T. Vo
*Attorney, Agent, or Firm*—Kenyon & Kenyon

[57] ABSTRACT

An object of the present invention is to positively feed a necessary amount OF fuel to each cylinder in starting an internal combustion engine and to enhance the startability of the internal combustion engine and the ignitability within each cylinder. In order to attain this object, according to the present invention, a start timing fuel injection controlling apparatus is an apparatus for controlling a fuel injection in starting an internal combustion engine having a plurality of cylinders and is provided with an intake non-synchronous injection means for performing fuel injection out of synchronism with a valve opening of an intake valve predetermined times for each cylinder, and an intake synchronous injection means for performing fuel injection in synchronism with the valve opening of the intake valve for each cylinder after the intake non-synchronous injection means has performed the intake non-synchronous injection for each cylinder the predetermined times.

2 Claims, 4 Drawing Sheets

FUEL INJECTION CONTROLLER APPARATUS IN STARTING AN INTERNAL COMBUSTION ENGINE

BACKGROUND OF THE INVENTION

1. Field of the Invention

The present invention relates to a fuel injection controlling apparatus for an internal combustion engine, and particularly to a technology for controlling a fuel injection timing in starting an internal combustion engine.

2. Description of the Related Art

In an internal combustion engine such as a gasoline engine or the like, a fuel injection controlling apparatus for determining a fuel injection timing or a fuel injection amount (fuel injection period) in response to an operational condition of the engine.

An apparatus for performing a fuel injection before opening an intake valve in starting the internal combustion engine, using a so-called intake non-synchronous injection system is known as such a fuel injection controlling apparatus.

By the way, since it is difficult to gasify the fuel at an extremely low temperature and it is likely that the fuel would adhere to a wall surface or the like, in the case where the intake non-synchronous injection type fuel injection controlling apparatus starts the internal combustion engine at an extremely low temperature, it is necessary to inject a large amount of fuel exceeding an amount of fuel to be adhered to an intake port or the like in advance. Namely, since the injection fuel is to be adhered to the intake port or the like, the intake non-synchronous injection type fuel injection controlling apparatus cannot form a combustible mixture within a combustion chamber unless a large amount of fuel is injected.

In order to solve such a problem, a fuel injection apparatus for an internal combustion engine disclosed in Japanese Patent Application Laid-open No. Sho 62-210230. This fuel injection apparatus is provided with a start timing detecting means for detecting a start timing of the engine, a temperature detecting means for detecting a temperature of the engine, and a means for performing the fuel injection in an intake stroke when it is detected by the above-described start timing detecting means and the above-described temperature detecting means that the engine is started under the condition of the temperature that is lower than a predetermined temperature, and is an intake synchronous injection type fuel injection apparatus for injecting fuel in synchronism with a valve opening timing of an intake valve of each cylinder.

In such an apparatus, since the fuel injection is performed in synchronism with the valve opening timing of the intake valve in starting the internal combustion engine, it is possible to feed a major portion of the fuel injected from the fuel injection valve directly into the combustion chamber. As a result, in the intake synchronous type fuel injection apparatus, it is possible to form a combustible mixture in the vicinity of the ignition plug at the fuel injection amount less than that of the intake non-synchronous injection type fuel injection apparatus.

SUMMARY OF THE INVENTION

In such an intake synchronous type fuel injection apparatus, in the case where the internal combustion engine is started when a temperature is relatively high, since the mixture is liable to be ignited in the cylinder into which the fuel has been injected, an engine RPM is increased by the ignition in the above-described cylinder, and an intake stroke period of a cylinder which takes an intake stroke after the ignition of the first mentioned cylinder becomes shortened. In this case, the intake synchronous type fuel injection apparatus cannot inject the necessary amount of fuel in the intake stroke in the cylinder that takes the intake stroke after the ignition of the cylinder. As a result, there is a problem that the mixture within the cylinder becomes a lean atmosphere, causing the ignitability to be worse, misfire or the like to degrade the startability of the internal combustion engine.

In view of the above-described problem, an object of the present invention is to positively feed the necessary amount of fuel into each cylinder in starting an internal good combustible mixture is formed in the cylinder and the mixture is likely to be ignited in the cylinder which takes the first fuel injection. In this case, the engine RPM is increased by the ignition of the above-described cylinder, and the intake stroke period of the cylinders that take the intake stroke after the ignition of the above-described cylinder is shortened. In these cylinders, since the fuel injection is performed before the intake valve is opened, i.e., out of synchronism with the intake stroke, a sufficient amount of fuel to form the combustible mixture is fed to each cylinder.

Also, when the internal combustion engine is started at a relatively low temperature, it is difficult to gasify the fuel. The fuel that has been injected in an intake non-synchronous injection manner is likely to be adhered to a wall surface or the like so that it is difficult to form the combustible mixture within the cylinder. However, when the number of the fuel injections for each cylinder exceeds the predetermined number, the fuel injection is performed in the valve opening of the intake valve of each cylinder, i.e., in synchronism with the intake stroke so that the combustible mixture is likely to be formed in each cylinder.

Accordingly, in the start timing fuel injection controlling apparatus for the internal combustion engine according to the present invention, in the case where the internal combustion engine is started under the condition of a relatively high temperature, even if the mixture is ignited in the cylinder into which the fuel is first injected, the fuel injection thereafter is performed out of synchronism with the intake stroke. As a result, a sufficient amount of fuel to form the combustible mixture in the cylinder is fed to each cylinder, thereby enhancing the startability of the internal combustion engine.

Also, in the start timing fuel injection controlling apparatus for the internal combustion engine according to the present invention, in the case where the internal combustion engine is started under the condition of a relatively low temperature, the fuel injection is performed out of synchronism with the intake stroke within a predetermined number of times. Accordingly, it is difficult to form the combustible mixture within each cylinder. However, the fuel injection is performed in synchronism with the intake stroke of each cylinder after the predetermined number of times so that the combustible mixture is likely to be formed within each cylinder, thereby obtaining the satisfactory startability.

Incidentally, the intake non-synchronous injection means performs the intake non-synchronous injection only once for each cylinder in starting the internal combustion engine. The second fuel injection and the injections thereafter for each cylinder may be performed by the intake synchronous injection means.

DETAILED DESCRIPTION OF PREFERRED EMBODIMENTS

An embodiment of a start timing fuel injection apparatus for an internal combustion engine according to the present invention will now be described with reference to the drawings.

Figure 2:
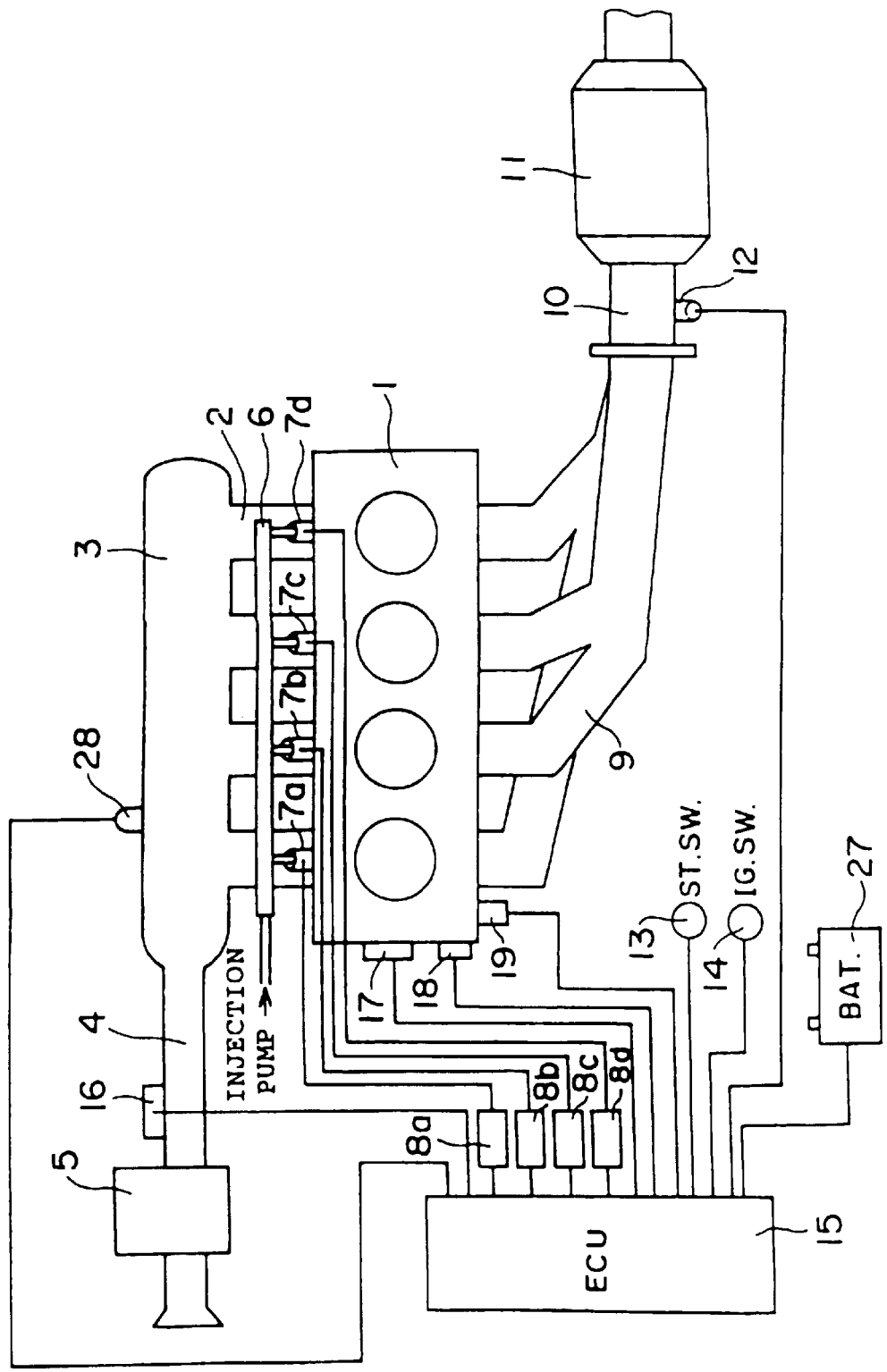
FIG. 2 is a view showing a schematic structure of an internal combustion engine to which a start timing fuel injection controlling apparatus for an internal combustion engine according to the present invention is applied.

FIG. 2 is a view showing a schematic structure of an internal combustion engine to which the present invention is applied. The internal combustion engine shown in the figure is a four-cycle four-cylinder internal combustion engine 1. A serge tank 3 is connected through an intake manifold 2 to the internal combustion engine 1, and at the same time an exhaust pipe 10 is connected through an exhaust manifold 9 to the engine 1.

The serge tank 3 is connected through an intake pipe 4 to an air cleaner box 5 for taking new air that has passed through the air cleaner box 5 and for distributing the air to each cylinder of the internal combustion engine 1 through the intake manifold 2. Then, mounted on the above-described intake pipe 4 are an air flow meter 16 for outputting an electric signal corresponding to the intake air mass that flows through the intake pipe 4 and an intake air temperature sensor 29 for outputting an electric signal corresponding to a temperature of the air that flows through the intake pipe 4. Mounted on the above-described serge tank 3 is a vacuum sensor 28 for outputting an electric signal corresponding to a pressure within the serge tank 3.

Subsequently, fuel injection valves 7a, 7b, 7c and 7d (hereinafter generally referred to as a fuel injection valve 7) are mounted on respective branch pipes of the above-described intake manifold 2. A fuel distribution pipe 6 is connected to these fuel injection valves 7. The above-described fuel distribution pipe 6 serves to distribute to the fuel injection valves 7 the fuel that has been pressurized and fed by a fuel pump (not shown).

Then, the above-described fuel injection valves 7 are connected to driving circuits 8a, 8b, 8c and 8d (hereinafter generally referred to as a driving circuit 8). The fuel injection valves 7 open when a drive current is applied thereto from the above-described driving circuits 8 and inject into the intake manifold 2 the fuel that has been fed from the fuel distribution pipe 6. combustion engine to enhance the startability of the internal combustion engine and the ignitability of each cylinder.

According to the present invention, the following means are adapted in order to solve the above-described problem. Namely, according to the present invention, a start timing fuel injection controlling apparatus for controlling a fuel injection in starting an internal combustion engine having a plurality of cylinders is characterized by comprising an intake non-synchronous injection means for performing fuel injection out of synchronism with a valve opening of an intake valve predetermined times for each cylinder, and an intake synchronous injection means for performing fuel injection in synchronism with the valve opening of the intake valve for each cylinder after the intake non-synchronous injection means has performed the intake non-synchronous injection for each cylinder the predetermined times.

The thus constructed fuel injection controlling apparatus performs the intake non-synchronous injection the predetermined times for each cylinder in starting the internal combustion engine, and thereafter performs the intake synchronous injection in synchronism with the intake stroke of each cylinder.

For example, in the case where the internal combustion engine is started at a relatively high temperature, since the fuel is likely to be gasified, a Next, an exhaust gas purifying catalyst 11 is provided in the midway of the above-described exhaust pipe 10 for purifying components such as NOx, HC contained in the exhaust gas discharged from the internal combustion engine 1. An air/fuel ratio sensor 12 for outputting a current corresponding to an air/fuel ratio of the exhaust gas that flows through the exhaust pipe 10 is mounted on the exhaust pipe 10 upstream of this exhaust purifying catalyst 11.

Also, mounted on the above-described internal combustion engine 1 are a crank position sensor 17 for outputting an electric signal whenever a crankshaft (not shown) rotates through a predetermined angle (for example, ten degrees), a rotational position of a cam position sensor 18 for outputting an electric signal when a cam shaft (not shown) is a predetermined position, and a water temperature sensor 19 for outputting an electric signal corresponding to a temperature of the cooling water.

The above-described cam position sensor 18 is an electromagnetic pickup type sensor for outputting an electric signal before a compression top dead center of the cylinder which is used as a reference. At this time, for example, the signal that is outputted from the above-described crank position sensor 17 immediately after the output of the cam position sensor 18 is set at ten degrees before the compression top dead center of the above-described reference cylinder.

Then, the above-described air/fuel sensor 12, the above-described air flow meter 16, the above-described crank position sensor 17, the above-described cam position sensor 18, the above-described water temperature sensor 19, the above-described vacuum sensor 28, the above-described intake air temperature sensor 29 are connected to the electronic control unit (ECU) 15 for controlling the engine so that the output signals of the respective sensors are inputted into the above-described ECU 15. Furthermore, a starter switch 13, an ignition switch 14 and a battery 27 are connected to the above-described ECU 15 so that an on/off signal of the starter switch 13, an on/off signal of the ignition switch 14 and a voltage value of the battery 27 are inputted thereinto.

Figure 3:
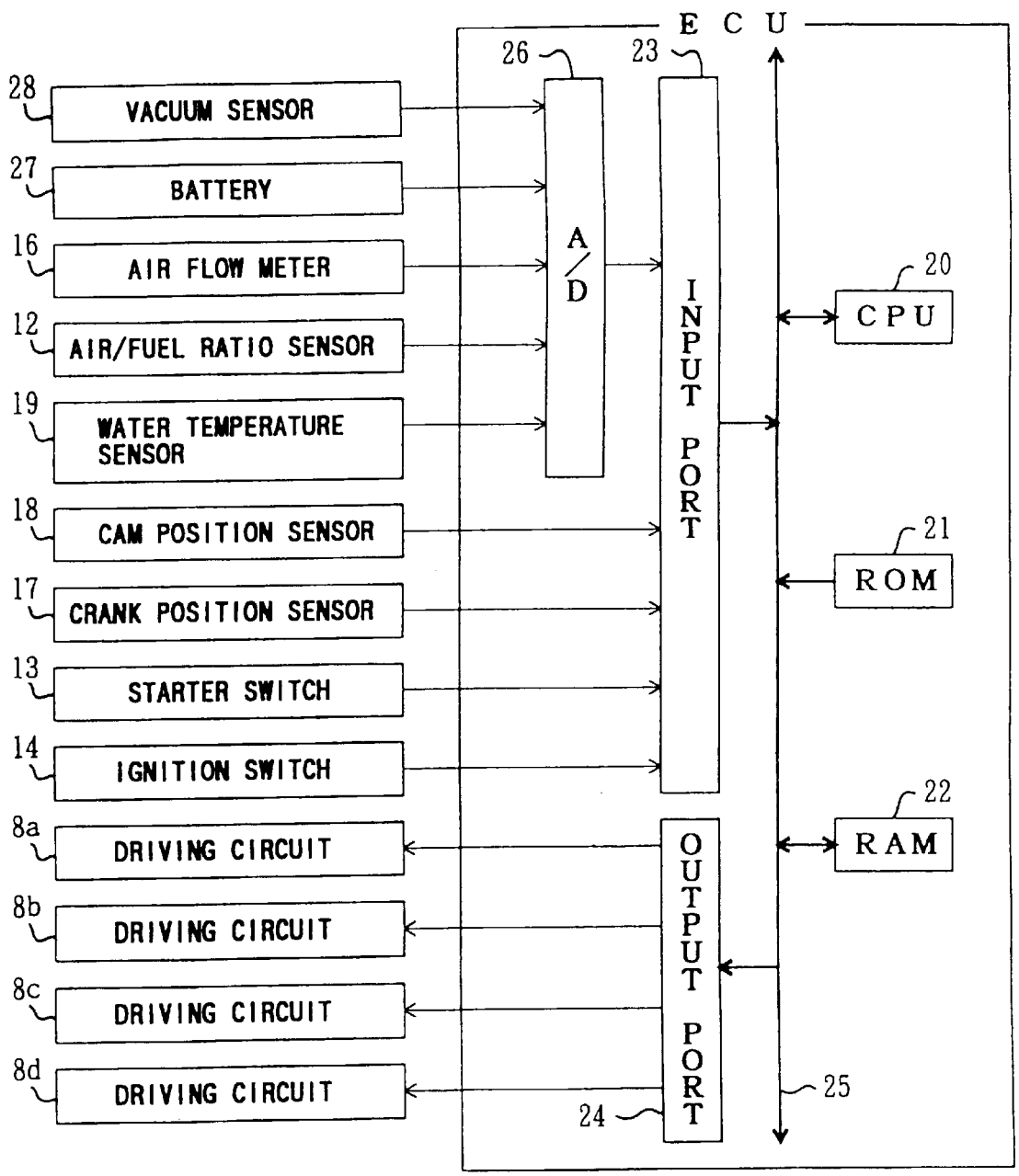
FIG. 3 is a block diagram showing an internal structure of an ECU.

As shown in FIG. 3, the above-described ECU 15 is provided with a CPU 20, a ROM 21, a RAM 22, an input port 23 and an output port 24 which are connected to each other through bidirectional buses 25 and is also provided with an A/D convertor (A/D) 26 connected to the above-described input port 23.

The above-described input port 23 receives the signals from the cam position sensor 18, the crank position sensor 17, the starter switch 13, the ignition switch 14 and the battery 27 and sends these signals to the CPU 20 or the RAM 22. Furthermore, the input port 23 inputs through the A/D convertor 26 the signals from the air flow meter 16, the air/fuel ratio sensor 12, the water temperature sensor 19, the vacuum sensor 28, and the intake air temperature sensor 29, and sends these signals to the CPU 20 or the RAM 22.

The above-described ROM 21 stores application programs such as a start timing fuel injection amount controlling routine for determining an amount of fuel injection in starting, a start time fuel injection timing controlling routine for determining a fuel injection timing in starting, a fuel injection amount controlling routine for determining a fuel injection amount after starting, a fuel injection timing controlling routine for determining a fuel injection timing after starting, or an ignition timing controlling routine for determining an ignition timing and various control maps. The above-described controlling maps are, for example, a star timing fuel injection timing controlling map for determining a fuel injection start timing in starting the internal combustion engine 1 or the like.

The above-described RAM 22 stores the output signals from the respective sensors, a calculation result of the CPU 20 or the like. The above-described calculation result is, for example, an engine RPM calculated in accordance with the output signal of the crank position sensor 17. The output signals from the respective sensors, the calculation result of the CPU 20 and the like are renewed whenever the crank position sensor 17 outputs the signal.

Furthermore, the RAM 22 stores a start identification flag that is set ("1") in starting the internal combustion engine 1 and reset (0") upon the completion of the start, and at the same time stores a sum of the number of the fuel injections in all the cylinders from the start of the starting operation of the internal combustion engine 1 (the total number of the fuel injections).

Subsequently, the above-described CPU 20 operates in accordance with the application program stored in the above-described ROM 21, calculates the fuel injection timing, the fuel injection amount or the like of each cylinder on the basis of the control map or the output signal of each sensor stored in the RAM 22, and controls the driving circuit 8 in accordance with the fuel injection timing or the fuel injection amount calculated.

In this case, if the internal combustion engine 1 is under the normal operation condition, the CPU 20 executes the fuel injection timing controlling routine and the fuel injection amount controlling routine stored in the ROM 21, calculates the fuel injection amount (the opening period of the fuel injection valve 7) in correspondence with the output signals of each sensor, and at the same time calculates he fuel injection start timing of each cylinder.

Also, if the internal combustion engine 1 is under the starting condition, the CPU 20 executes the start timing fuel injection amount controlling routine and the start timing fuel injection timing controlling routine stored in the ROM 21, and calculates the fuel injection amount and the fuel injection timing of each cylinder. For example, the fuel injection amount in starting is calculated in correspondence with the cooling water temperature, the battery voltage, the intake pipe pressure or the like in starting.

Then, the fuel injection timing in starting is calculated as follows. Namely, the CPU 20 stores the total number of the fuel injections in the RAM 22 from starting and increments by one every time of fuel injection. Subsequently, the CPU 20 judges whether or not the total number of the fuel injections after the increment is not greater than the number of the cylinders of he internal combustion engine 1 whenever the total number of the fuel injections stored in the RAM 22 is incremented.

When the above-described total number of the fuel injections is not greater than the above-described number of the cylinders, the CPU 20 sets the fuel injection timing so that the fuel injection is completed out of synchronism with the intake stroke of each cylinder, i.e., before the start of the intake stroke of each cylinder, and when the above-described total number of the fuel injections is greater than the above-described number of the cylinders, the CPU 20 sets the above-described fuel injection timing so that the fuel injection is performed in synchronism with the intake stroke of each cylinder, i.e., during the intake stroke of each cylinder.

Figure 1:
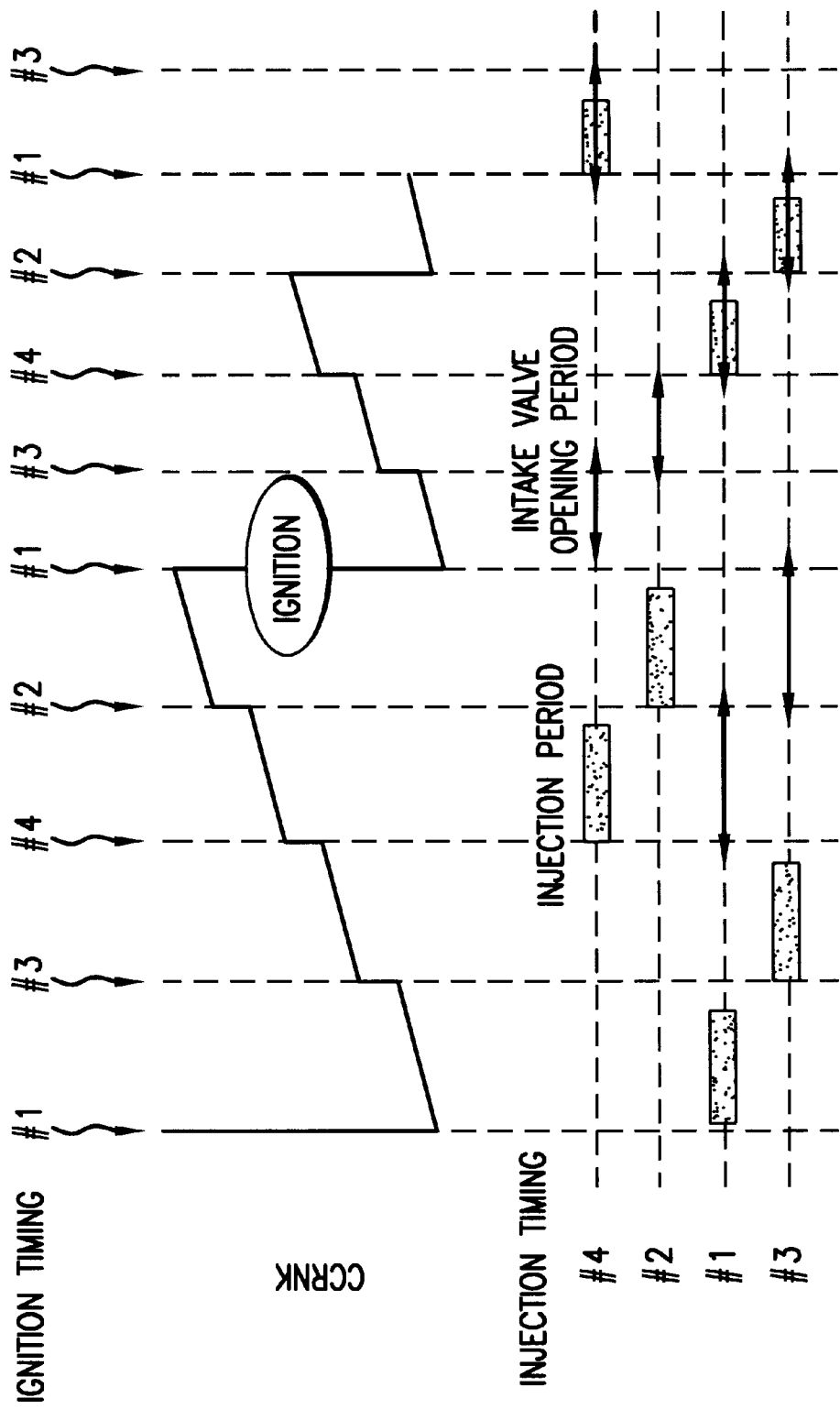
FIG. 1 is a timing chart showing a fuel injection period of each cylinder in starting.

For example, in a four stroke four cylinder internal combustion engine, in the case where the fuel injection is performed in the order of a first cylinder #1, a third cylinder #3, a fourth cylinder #4 and a second cylinder #2, as shown in FIG. 1, with respect to the first four fuel injections (the first fuel injection for each cylinder), the CPU 20 sets the fuel injection timing out of synchronism with the intake stroke of each cylinder, i.e., before the intake stroke of each cylinder (in an expansion stroke in each cylinder in FIG. 1). Then, with respect to the fifth fuel injection and the injections thereafter (second fuel injection and injections thereafter for each cylinder), the fuel injection timing is set at the timing in synchronism with the intake stroke of each cylinder.

In FIG. 1, the mixture is ignited in the first cylinder #1 in which the first fuel injection is performed, and the intake stroke period for the cylinders which take the intake stroke thereafter (third cylinder #3, fourth cylinder #4, second cylinder #2) is shortened. However, in the third cylinder #3, fourth cylinder #4 and second cylinder #2, the fuel injection has been completed before the intake stroke. Accordingly, a necessary amount of fuel is fed to each cylinder. As a result, the internal combustion engine 1 is likely to start by the first fuel injection for each cylinder. Then, the second fuel injection and the injections thereafter are performed in synchronism with the intake stroke of each cylinder.

Thus, the CPU 20 executes the application program of the ROM 21 to thereby realize the intake non-synchronism injection means and the intake synchronism injection means to which the present invention pertains.

The operation and effect of the start timing fuel injection controlling apparatus for the internal combustion engine according to the present embodiment will now be described.

In starting the internal combustion engine 1, when the ON signal of the ignition switch 13 and the ON signal of the starter switch 14 are inputted, the CPU 20 calculates the engine RPM in accordance with the output signal of the crank position sensor 18. Then, if the above-described engine RPM is less than a predetermined RPM, the CPU 20 judges that the internal combustion engine 1 is under the starting condition, and sets the start identification flag "1" in a predetermined region of the RAM 22.

Also, immediately after the output of the signal from the cam position sensor 18, the CPU 20 judges that the signal outputted from the crank position sensor 17 is a signal representative of the compression top dead center of the reference cylinder, and judges the compression top dead center of the cylinders other than the reference cylinder.

Figure 4:
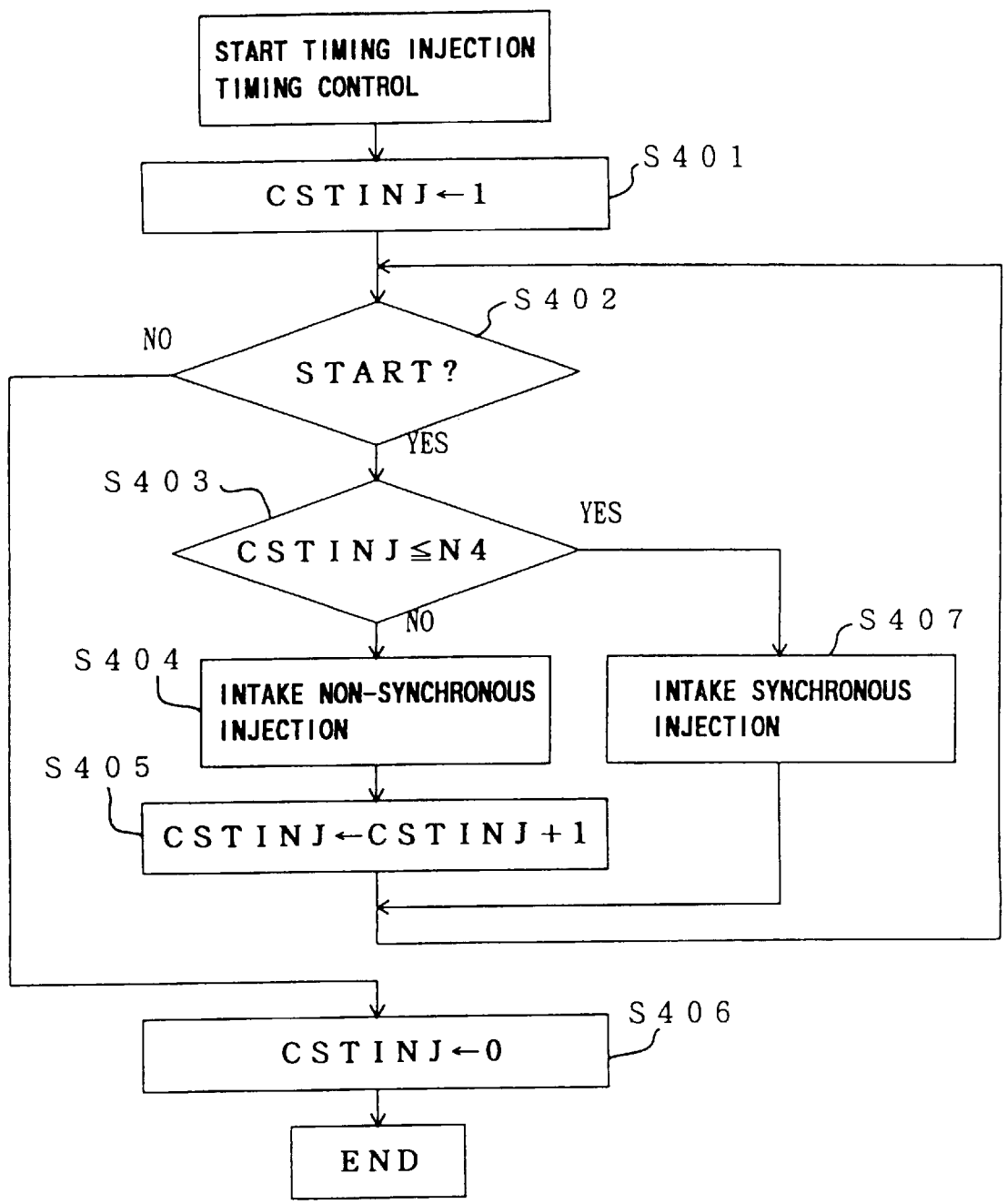
FIG. 4 is a flowchart showing a start timing injection period controlling routine.

Subsequently, the CPU 20 executes the start timing fuel injection timing controlling routine shown in FIG. 4, and determines the fuel injection timing for each cylinder. In the above-described start timing fuel injection timing controlling routine, the CPU 20 first accesses the RAM 22 and writes "1" representative of the total fuel injection number: CSTINJ (S401).

Subsequently, the CPU 20 accesses the RAM 22 and judges whether or not the value of the start identification flag (XSTEFI) is set at "1", that is, whether or not the internal combustion engine 1 is under the start condition (S402).

In the above-described S402, if the CPU 20 judges that the value of the start identification flag (XSTEFI) is set at "1", the CPU 20 judges that the internal combustion engine 1 is under the starting condition and advances to S403.

In the above-described S403, the CPU 20 judges whether or not the value of the total fuel injection number CSTINJ stored in the RAM 22 is not greater than the number of cylinders N4 (N4=4 in the present embodiment). In this case, since the injection is the first fuel injection, and the total fuel injection number CSTINJ of the RAM 22 is "1", the CPU 20 judges that the total fuel injection number CSTINJ is 0 equal to or less than the cylinder number N4 and advances to S404.

In the above-described S404, the CPU 20 sets the fuel injection timing out of synchronism with the intake stroke. Subsequently, the CPU 20 refers to the output signal of the crank position sensor 17, and when the crank position sensor 17 outputs the signal representative of the above-described fuel injection timing, the CPU 20 feeds the control signal to the driving circuit 8 corresponding to the cylinder in which the fuel injection is to be performed, thereby executing the fuel injection for the above-described cylinder.

Then, the CPU 20 advances to S405 and increments by one the value of the total fuel injection number CSTINJ stored in the RAM 22 (namely, rewrites the value of the total fuel injection number CSTINJ to "2").

Thus, the CPU 20 sets the fuel injection timing of the cylinder (first cylinder) in which the fuel injection is to be first performed out of synchronism with the intake stroke of the above-described first cylinder.

Subsequently, the CPU 20 returns back to the above-described S402 to determine the fuel injection timing of the cylinder (second cylinder) in which the fuel injection is performed next to the first cylinder. In this case, in S403, the CPU 20 judges that the total fuel injection number CSTINJ (=2) is equal to or less than four and advances to S404. Then, in the above-described S404, the CPU 20 sets the fuel injection timing out of synchronism with the intake stroke of the second cylinder. Subsequently, the CPU 20 accesses the RAM 22 in S405 and increments by one the value of the total fuel injection number CSTINJ (namely, rewrites the value of the total fuel injection number CSTINJ to "3").

Furthermore, the CPU 20 returns back to the above-described S402 after determining the fuel injection timing for the second cylinder and determines the fuel injection timing for a cylinder (third cylinder) in which the fuel injection is to be performed next to the second cylinder. In this case, in S403, the CPU 20 judges that the total fuel injection number CSTINJ (=3) is equal to or less than four and advances to S404, and the CPU 20 sets the fuel injection timing out of synchronism with the intake stroke of the third cylinder. Subsequently, the CPU 20 accesses the RAM 22 in S405 and increments by one the value of the total fuel injection number CSTINJ (namely, rewrites the value of the total fuel injection number CSTINJ to "4").

Subsequently, the CPU 20 returns back to the above-described S402 after determining the fuel injection timing for the third cylinder and determines the fuel injection timing for a cylinder (fourth cylinder) in which the fuel injection is to be performed next to the third cylinder. In this case, in S403, the CPU 20 judges that the total fuel injection number CSTINJ (=4) is equal to or less than four and advances to S404. Then, in the above-described S404, the CPU 20 sets the fuel injection timing out of synchronism with the intake stroke of the fourth cylinder. Subsequently, the CPU 20 accesses the RAM 22 in S405 and increments by one the value of the total fuel injection number CSTINJ (namely, rewrites the value of the total fuel injection number CSTINJ to "5").

When the first fuel injection timing has been thus determined with respect to all the cylinders for the internal combustion engine 1, the second fuel injection timing for the above-described first cylinder is to be determined. The mixture of each cylinder is ignited by the first fuel injection, and the start of the internal combustion engine 1 has been completed. Then, the CPU 20 judges that the start of the internal combustion engine 1 has been completed and rewrites the value of the start identification flag (XSTEFI) of the RAM 22 to "0". As a result, the CPU 20 judges in S402 of the above-described start timing fuel injection timing controlling routine that the internal combustion engine 1 is not under the starting condition and advances to S406. Then, the CPU 20 resets in the above-described S406 the value of the total fuel injection number CSTINJ of the RAM 22 (rewriting the value of the total fuel injection number CSTINJ to "0").

On the other hand, in the case where the start of the internal combustion engine 1 has not been completed by the first fuel injection for all the cylinders of the internal combustion engine 1, the CPU 20 sets the second fuel injection timing for each cylinder in accordance with the above-described start timing fuel injection timing controlling routine. In this case, the CPU 20 judges in S403 of the above-described start timing fuel injection timing controlling routine that the total fuel injection number CSTINJ exceeds four and advances to S407. Then, the CPU 20 sets in S407 the second fuel injection timing for each cylinder in synchronism with the intake stroke of each cylinder.

Thus, according to the present embodiment, in starting the internal combustion engine 1, the first fuel injection for each cylinder is performed out of synchronism of the intake stroke of each cylinder, and the second fuel injection and the injection thereafter for each cylinder is performed in synchronism of the intake stroke of each cylinder. Accordingly, for example, in the case where the internal combustion engine 1 is started under the condition of a relatively high temperature and the mixture is ignited in the cylinder in which the fuel injection is first performed, a sufficient amount of fuel to form the combustible mixture is fed to the cylinders in which the fuel injection is performed after the above-described cylinder.

On the other hand, in the case where the internal combustion engine 1 is started under the condition of a relatively low temperature and it is difficult to gasify the fuel, the first fuel injection for each cylinder is performed out of synchronism with the intake stroke of each cylinder. Accordingly, the injected fuel is likely to be adhered to the intake port of each cylinder or the like and it becomes difficult to form the combustible mixture in the cylinders. However, since the second fuel injection and the injections thereafter for each cylinder are performed in synchronism with the intake stroke of each cylinder, it is possible to feed a sufficient amount of fuel to each cylinder to form the combustible mixture.

Incidentally, in the present embodiment, the four cylinder internal combustion engine is exemplified, but the invention is not limited thereto and may be applied to an internal combustion engine having four or more cylinders or less than four cylinders. In short, in starting the internal combustion engine, it is sufficient to perform the first fuel injection for each cylinder out of synchronism with the intake stroke and to perform the second fuel injection and injections thereafter in synchronism with the intake stroke.

What is claimed is:

1. A fuel injection controlling apparatus in starting an internal combustion engine, comprising:

an internal combustion engine provided with a plurality of cylinders;

an intake non-synchronous injection means for performing the fuel injection out of synchronism with valve opening of an intake valve of each cylinder by predetermined times for each cylinder in starting said internal combustion engine; and an intake synchronous injection means for performing the fuel injection in synchronism with the valve opening of the intake valve for each cylinder after said intake non-synchronous injection means has performed the intake non-synchronous injection by predetermined times for each cylinder.

2. A fuel injection controlling apparatus in starting an internal combustion engine as claimed in claim 1, wherein said intake non-synchronous injection means performs only one intake non-synchronous injection for each cylinder in starting said internal combustion engine.

* * * * *